(12) United States Patent
Jassal et al.

(10) Patent No.: US 11,095,198 B2
(45) Date of Patent: Aug. 17, 2021

(54) ELECTRIC MACHINE ASSEMBLY WITH REDUCED ROTOR POST LEAKAGE

(71) Applicant: General Electric Company, Schenectady, NY (US)

(72) Inventors: Anoop Jassal, Niskayuna, NY (US); Mohamed Osama, Garching b. Munchen (DE); Konrad Weeber, Niskayuna, NY (US); Joseph Zierer, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 16/146,495

(22) Filed: Sep. 28, 2018

(65) Prior Publication Data
US 2020/0106350 A1    Apr. 2, 2020

(51) Int. Cl.
*H02K 19/10*    (2006.01)
*H02K 1/24*    (2006.01)
(Continued)

(52) U.S. Cl.
CPC .......... *H02K 19/103* (2013.01); *H02K 1/246* (2013.01); *H02K 1/2766* (2013.01); *H02K 15/03* (2013.01); *H02K 21/14* (2013.01)

(58) Field of Classification Search
CPC .... H02K 19/103; H02K 1/246; H02K 1/2766; H02K 15/03; H02K 21/14; H02K 37/04; H02K 37/10; H02K 1/22; H02K 21/028
See application file for complete search history.

(56) References Cited

U.S. PATENT DOCUMENTS 4,459,502 A * 7/1984 El-Antably ............ H02K 29/06
310/125
4,888,513 A * 12/1989 Fratta ..................... H02K 1/246
310/216.017
(Continued)

FOREIGN PATENT DOCUMENTS

CN    204967578 U    1/2016
EP    3522336 A1    8/2019
(Continued)

OTHER PUBLICATIONS

Fei et al., "Comparison of Cogging Torque Reduction in Permanent Magnet Brushless Machines by Conventional and Herringbone Skewing Techniques," IEEE Transactions on Energy Conversion, vol. 28, Issue No. 3, pp. 664-674, Sep. 2013.
(Continued)

*Primary Examiner* — Mohamad A Musleh
(74) *Attorney, Agent, or Firm* — McGarry Bair PC

(57) ABSTRACT

An electric machine assembly includes a rotor formed from one or more magnetically conductive sheets having elongated magnetic flux barriers separated from each other in radial directions that radially extend away from an axis of rotation of the rotor. The magnetic flux barriers are separated from each other by magnetic flux carrier portions of the one or more magnetically conductive sheets. The assembly also includes a non-magnetic post coupled with the magnetic flux carrier portions of the one or more magnetically conductive sheets on opposite sides of at least one of the magnetic flux barriers. The non-magnetic post is elongated in the radial directions from a first magnetic flux carrier portion to a second magnetic flux carrier portion of the magnetic flux carrier portions on the opposite sides of the at least one magnetic flux barrier.

16 Claims, 6 Drawing Sheets

(51) Int. Cl.
*H02K 1/27* (2006.01)
*H02K 15/03* (2006.01)
*H02K 21/14* (2006.01)

(56) References Cited

U.S. PATENT DOCUMENTS

| | | | | |
|---|---|---|---|---|
| 4,918,831 | A * | 4/1990 | Kliman | H02K 1/246 228/185 |
| 5,117,553 | A * | 6/1992 | Kliman | H02K 1/2766 29/447 |
| 5,554,900 | A * | 9/1996 | Pop, Sr. | H02K 1/2773 310/156.61 |
| 6,684,483 | B2 | 2/2004 | Rahman et al. | |
| 7,932,658 | B2 | 4/2011 | Ionel | |
| 9,641,033 | B2 | 5/2017 | Papini et al. | |
| 9,917,495 | B2 | 3/2018 | Laldin | |
| 9,973,069 | B2 | 5/2018 | Mochida | |
| 10,432,049 | B2 * | 10/2019 | Saint-Michel | H02K 3/12 |
| 2003/0062791 | A1 * | 4/2003 | Reiter, Jr. | H02K 1/246 310/156.53 |
| 2003/0201685 | A1 * | 10/2003 | Shimada | H02K 1/2766 310/156.53 |
| 2009/0224624 | A1 | 9/2009 | Kumar et al. | |
| 2012/0139378 | A1 * | 6/2012 | Endo | H02K 1/28 310/156.21 |
| 2013/0026871 | A1 | 1/2013 | Van Dam et al. | |
| 2016/0294262 | A1 | 10/2016 | Yomoda et al. | |
| 2017/0155309 | A1 | 6/2017 | Jassal et al. | |
| 2017/0163106 | A1 * | 6/2017 | Jassal | H02K 15/02 |
| 2017/0310171 | A1 | 10/2017 | Reddy et al. | |

FOREIGN PATENT DOCUMENTS

| | | |
|---|---|---|
| JP | 2005130604 A | 5/2005 |
| JP | 2009201269 A | 9/2009 |
| JP | 5387033 B2 | 1/2014 |
| WO | 2011132250 A1 | 10/2011 |

OTHER PUBLICATIONS

Ayub et al., "Design of interior permanent magnet synchronous machine for torque characteristic improvement by increasing reluctance torque and reducing leakage flux," 2017 20th International Conference on Electrical Machines and Systems (ICEMS), pp. 1-6, Sydney, NSW, 2017.

Extended European Search Report dated Feb. 17, 2020 for corresponding EP application No. 19200171.1-1201. (8 pages).

* cited by examiner

ELECTRIC MACHINE ASSEMBLY WITH REDUCED ROTOR POST LEAKAGE

FIELD

The subject matter described herein relates to electric machines, such as electric motors.

BACKGROUND

Electric machines such as synchronous reluctance and interior permanent magnet (IPM) machines rely on the flow of magnetic flux in rotors of the machines to generate torque. The rotors include mechanical features (e.g., shapes) which act as magnetic flux guiding channels and other features that operate as flux barriers. These guiding channels provide a smaller reluctance path along one axis of the machine (e.g., the direct or d-axis) and the flux barriers provide a greater reluctance path along another axis of the machine (e.g., the quadrature or q-axis). The difference in reluctance along these different paths and axes provides an overall reluctance torque.

The difference in reluctance is created by the shape and size of the flux guiding channels and flux barriers in the rotor. Due to the speed at which the rotor spins during operation, the flux guiding channels may be subject to large forces. Posts can extend between the channels and bridges can connect the ends of the channels to provide structural support to the flux guiding channels. But, these posts and bridges provide locations for increased flux leakage in the machine. This flux leakage decreases the power factor and torque density of the machines, and can require increased voltages to be supplied to power the machines.

BRIEF DESCRIPTION

In one embodiment, an electric machine assembly includes a rotor formed from one or more conductive sheets having elongated magnetic flux barriers separated from each other in radial directions that radially extend away from an axis of rotation of the rotor. The magnetic flux barriers are separated from each other by magnetic flux carrier portions of the one or more conductive sheets. The assembly also includes a non-magnetic post coupled with the magnetic flux carrier portions of the one or more conductive sheets on opposite sides of at least one of the magnetic flux barriers. The non-magnetic post is elongated in the radial directions from a first magnetic flux carrier portion to a second magnetic flux carrier portion of the magnetic flux carrier portions on the opposite sides of the at least one magnetic flux barrier.

In one embodiment, a rotor of an electric machine assembly includes plural conductive sheets laminated with each other. The conductive sheets have elongated magnetic flux barriers separated from each other in radial directions that radially extend away from an axis of rotation of the rotor. The magnetic flux barriers are separated from each other by magnetic flux carrier portions of the one or more conductive sheets. The rotor also includes non-magnetic posts coupled with the magnetic flux carrier portions of the one or more conductive sheets on opposite sides of at least one of the magnetic flux barriers. The non-magnetic posts are elongated in the radial directions from a first magnetic flux carrier portion to a second magnetic flux carrier portion of the magnetic flux carrier portions on the opposite sides of each of the magnetic flux barriers.

In one embodiment, a method includes obtaining conductive sheets and forming elongated magnetic flux carrier portions of the conductive sheets by cutting elongated magnetic flux barriers into the conductive sheets. The magnetic flux barriers are cut into the conductive sheets such that the magnetic flux barriers are separated from each other in radial directions of the conductive sheets. The method also includes inserting non-magnetic posts into the magnetic flux barriers such that each of the non-magnetic post is elongated in a different radial direction of the radial directions from a first magnetic flux carrier portion to a second magnetic flux carrier portion of the magnetic flux carrier portions on opposite sides of at least one magnetic flux barrier, and forming at least part of a rotor for an electric machine assembly using the conductive sheets having the magnetic flux carrier portions, the non-magnetic posts, and the magnetic flux barriers.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein relate to electric machine assemblies that provide for improved torque density due at least in part to changes in the features in the machines that provide for magnetic flux carrier portions and/or magnetic flux barrier portions. The machines can be synchronous reluctance and interior permanent magnet machines. A stator of the machine can be a stator having distributed or concentrated windings. A rotor of the machine includes a laminated stack of electrical sheets (e.g., steel sheets) that are insulated from each other and clamped together. The rotor includes features that operate as magnetic flux guiding channels having a lower reluctance along the quadrature or q-axis of the machine, and a higher reluctance along the direct or d-axis of the machine.

The difference in reluctance along the different axes leads to an overall reluctance torque of the machine. The difference in reluctance is created by the shape and size of the flux carrier portions and the flux barrier portions of the rotor. In one embodiment of the inventive subject matter, the ferromagnetic posts that are present in some known electric machines are replaced with non-magnetic posts, or posts that are not formed from a ferromagnetic material and therefore do not allow magnetic flux to flow through the non-magnetic posts. Removing the magnetic posts from the rotor can reduce the flux leakage that occurs in the posts of known machines. This can improve the power factor of the machine by increasing the torque density of the machine and/or reducing the voltage needed to generate the same amount of torque (as a machine with ferromagnetic posts).

In one embodiment, the non-ferromagnetic posts described herein are formed from one or more dielectric or insulating materials, and are not formed from a dual phase magnetic material. Dual phase magnetic materials can be made non-magnetic at selected locations, but these materials can have relatively low mechanical strength (e.g., no greater than 80 ksi). This lower strength may result in damage or destruction of the posts in some machines. Conversely, using the non-ferromagnetic posts described herein can reduce flux leakage while providing a greater mechanical strength (e.g., greater than 80 ksi and up to 200 ksi or more).

Figure 1:
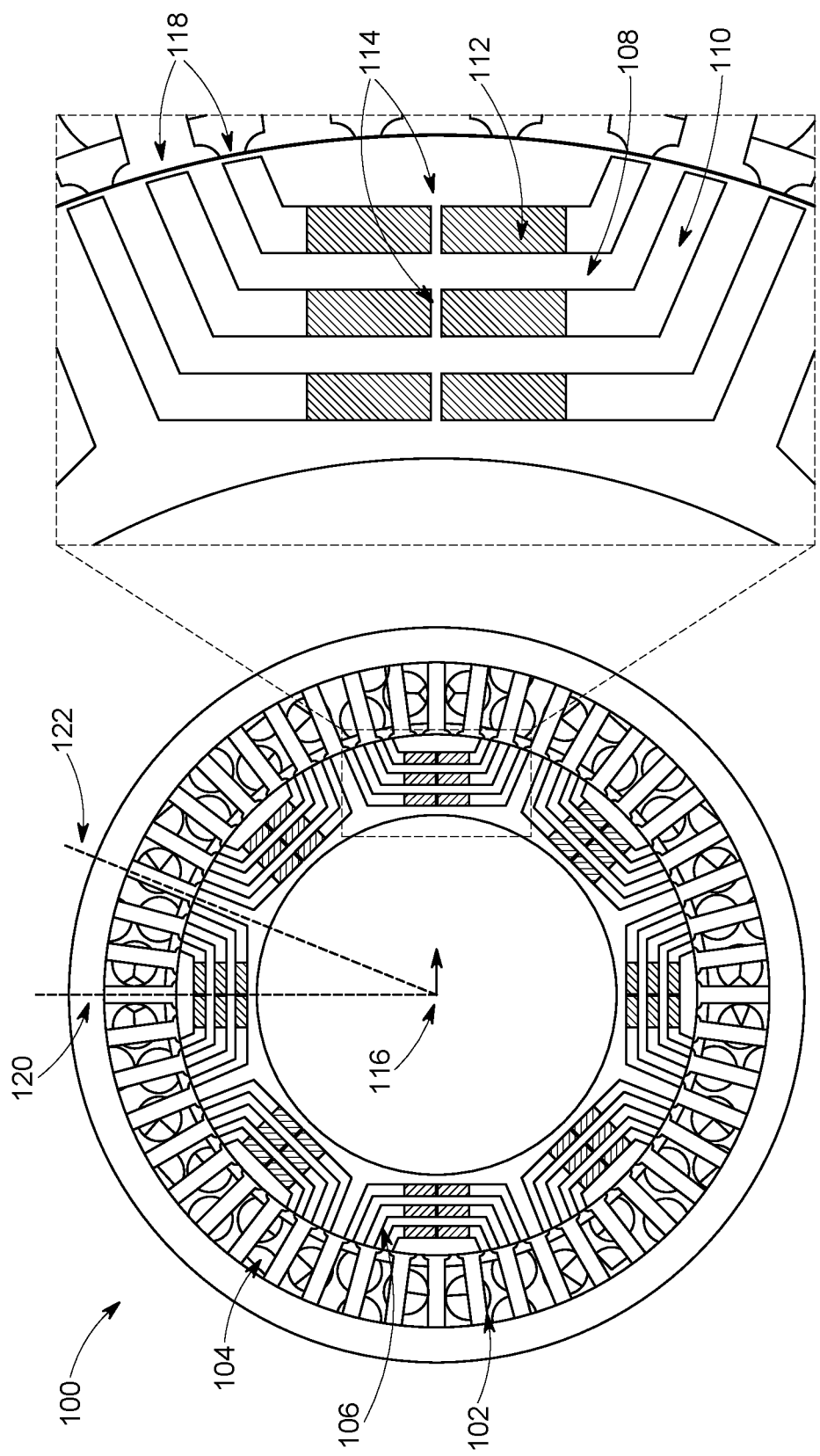
FIG. 1 illustrates one example of an electric machine assembly.

FIG. 1 illustrates one example of an electric machine assembly 100. The electric machine 100 can be a synchronous reluctance and interior permanent magnet machine. The electric machine 100 includes a stator 102 having distributed or concentrated conductive windings 104 through which electric current is conducted to cause the electric machine 100 to operate. The electric machine 100 also includes a rotor 106 formed from a laminated stack of conductive sheets (e.g., steel sheets), insulated from each other and clamped together. The machine assembly 100 can operate as a motor that operates to propel a vehicle. For example, the rotor 106 can be rotated by the electric current in the windings 104 of the stator 102, which rotates a shaft joined to the rotor 106. This shaft can be coupled with turbine blades, axles, wheels, or the like, to help propel a vehicle such as an airplane, land-based vehicle (e.g., automobile, rail vehicle, mining vehicle, etc.), or marine vessel.

The rotor 106 is formed from a ferromagnetic material that allows magnetic flux to flow through the rotor 106. The rotor 106 includes several features that define magnetic flux carrier portions 108 of the rotor 106 and magnetic flux barriers 110 of the rotor 106. The flux barriers 110 are portions of the rotor 106 that have been removed, such as air gaps in the rotor 106. Permanent magnets 112 can be placed inside these flux barriers 110. Alternatively, no magnets 112 are in the flux barriers 110. The flux carrier portions 108 represent segments of the rotor 106 that remain after the flux barriers 110 are cut from, removed, or otherwise formed in the rotor 106.

Neighboring flux carrier portions 108 are connected by elongated ferromagnetic posts 114 along radial directions (e.g., directions that radially extend from a center axis or axis of rotation 116 of the rotor 106). The ends of the flux carrier portions 108 are connected by elongated bridges 118 along circumferential directions (e.g., directions that circumferentially surround the axis of rotation 116 of the rotor 106). The flux carrier portions 108 and/or bridges 118 can be formed when the flux barriers 110 are cut from the sheets forming the rotor 106.

In operation, a varying electric current is conducted through the windings 104 to cause the rotor 106 to rotate relative to the stator 102. This current creates magnetic flux in the rotor 106. The flux carrier portions 108 guide and carry magnetic flux in the rotor 106 while the barrier portions 110 block or impede flow of the magnetic flux in the rotor 106. These portions 108, 110 create a larger reluctance path in the rotor 106 along a first axis 120 (e.g., the quadrature or 'q' axis of the rotor 106) and a smaller reluctance path in the rotor 106 along a different, second axis 122 (e.g., the direct or 'd' axis of the rotor 106). The difference in reluctance along the different axes 120, 122 leads to an overall reluctance torque. The difference in reluctance can be created by the shape and size of the flux carrier portions 108 and the flux barrier portions 110.

One problem with the rotor 106 is that a significant amount of magnetic flux can leak of the lower reluctance path along the axis 120 at the posts 114. The leaking flux in the posts 114 reduces the power factor of the rotor 106, reduces the torque density of the rotor 106, and can require more current to be conducted through the windings 104 to generate the same amount of torque (as a rotor 106 that does not have as much flux leakage at the posts 114).

Figure 2:
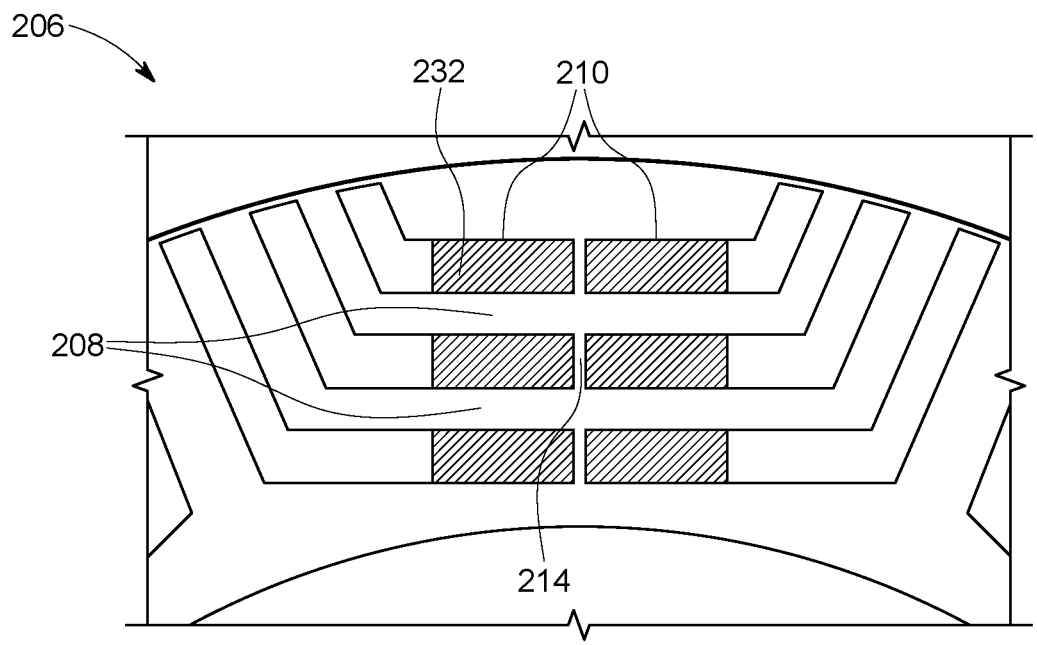
FIG. 2 illustrates one example of a segment of a rotor of the machine assembly shown in FIG. 1 having flux carrier portions and flux barrier portions.

FIG. 2 illustrates one example of a segment of a rotor 206 having flux carrier portions 208 and flux barrier portions 210. The rotor 206 can be similar to the rotor 106 shown in FIG. 1, except that the shape and number of the portions 208, 210 may differ from the portions 108, 110 shown in FIG. 1. Permanent magnets 232 can be inserted in the barrier portions 210, as described above. A post 214 connects neighboring flux carrier portions 208, as described above.

Figure 3:
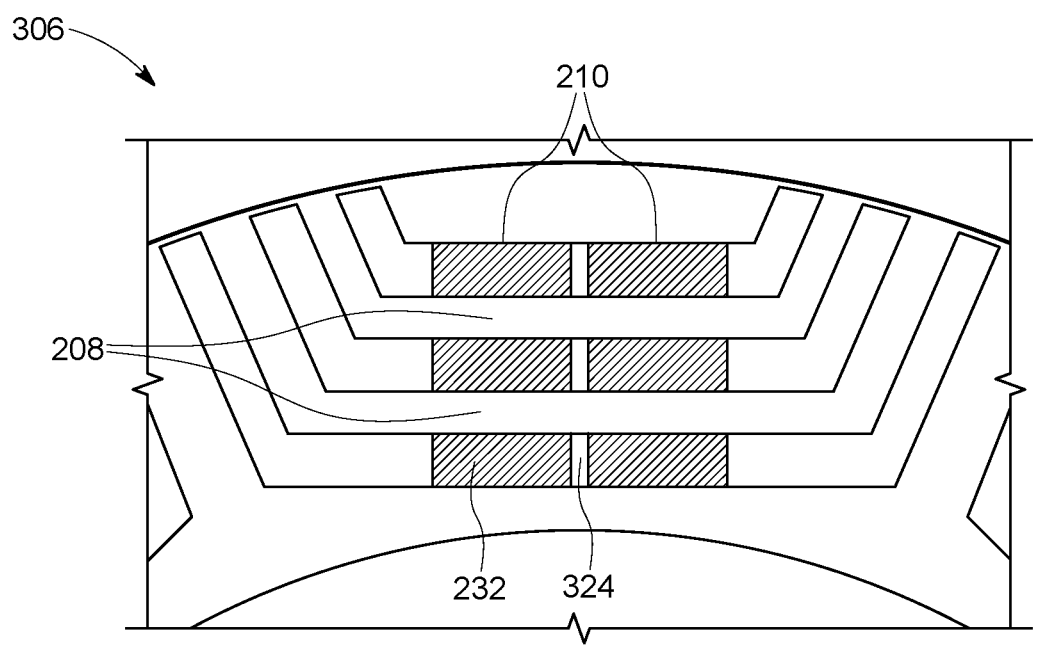
FIG. 3 illustrates one embodiment of a segment of a rotor of the machine assembly shown in FIG. 1 having the flux carrier portions and the flux barrier portions shown in FIG. 2.

One option to reduce the flux leakage at the posts 114, 214 in the rotors 106, 206 is to remove the posts 114, 214. FIG. 3 illustrates one embodiment of a segment of a rotor 306 having the flux carrier portions 208 and the flux barrier portions 210 shown in FIG. 2. The rotor 306 can be similar to the rotors 106, 206, except that the posts 114, 214 in the rotors 106, 206 are removed in the rotor 306. Instead, an airgap 324 is left in the space where the post 214 is located in the rotor 206.

Figure 4:
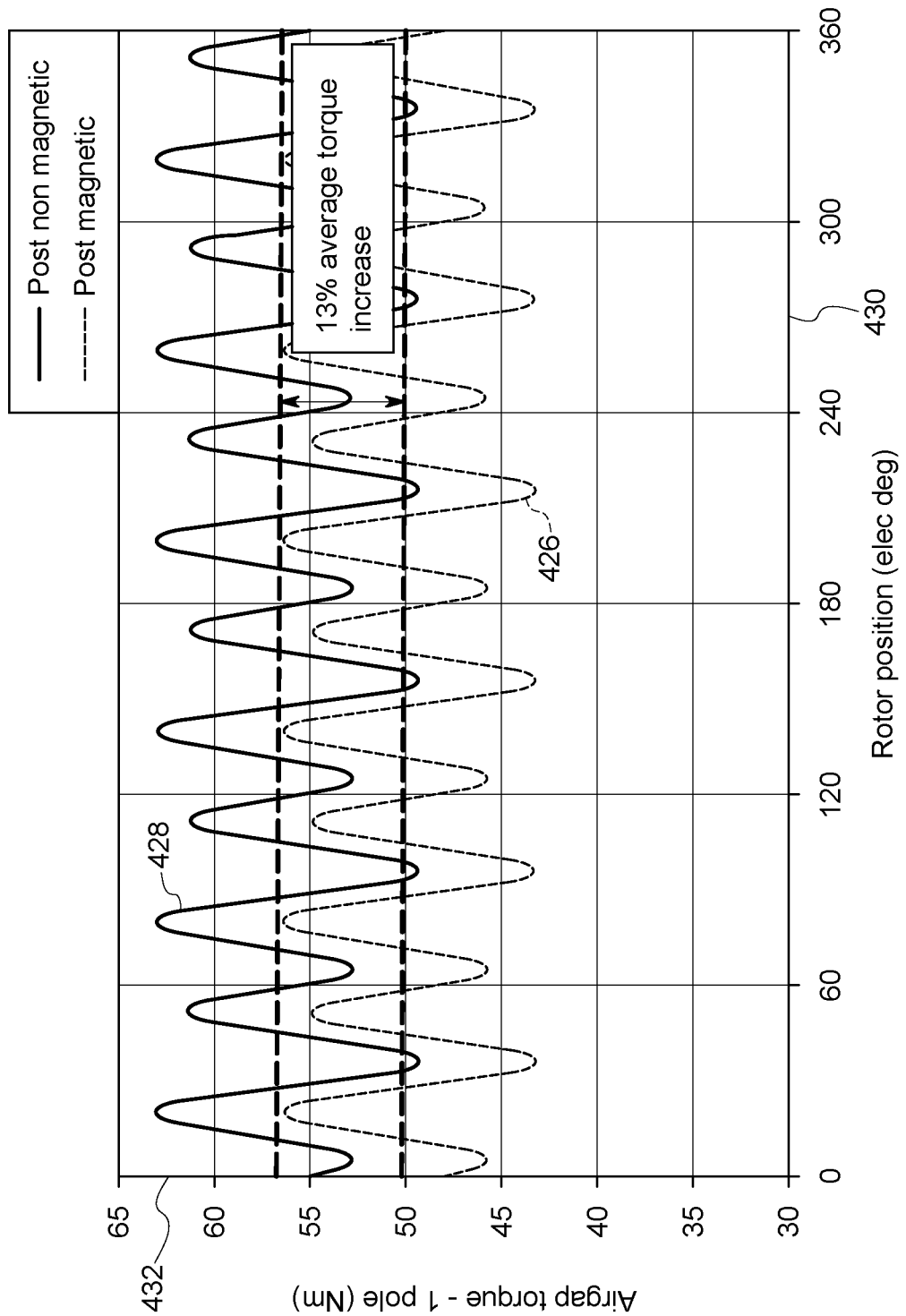
FIG. 4 illustrates examples of airgap torques that are generated by rotation of the rotors shown in FIGS. 2 and 3 with and without ferromagnetic posts shown in FIG. 2.

Removing the ferromagnetic post 114, 214 from the rotors 106, 206 can reduce the leakage of magnetic flux along the q-axes 120 in the rotors 106, 206. FIG. 4 illustrates examples of airgap torques 426, 428 that are generated by rotation of the rotors 206, 306 with and without the ferromagnetic posts 214, respectively. The torques 426, 428 represent the amount of torque generated by rotation of the rotors 206, 306 upon application of the same electric current to the conductive windings 104 in the stator 102 (shown in FIG. 1). The torques 426, 428 are shown alongside a horizontal axis 430 representative of positions of the rotors 206, 306 and alongside a vertical axis 432 representative of torques generated by the rotors 206, 306. As shown, the torques 428 generated by the rotors 306 that do not include the ferromagnetic posts 114, 214 are significantly greater than the torques 426 generated by the rotors 106, 206 that include the ferromagnetic posts 114, 214. For example, removing the ferromagnetic posts 114, 214 can increase the torque generated by rotation of the rotor by an average of 13% across all rotor positions.

In one embodiment, an electric machine assembly 100 includes the stator 102 and the rotor 306 having the airgap 324 in place of the posts 114, 214. The airgap 324 can be a space or void that does not include any ferromagnetic material and can be referred to as a non-magnetic space or void. The airgap 324 can be bounded by the permanent magnets 323 on both circumferential sides of the airgap 324 (e.g., the opposite sides of the airgap 324 that are along a circumferential direction relative to the rotation axis 116) and can be bounded by the flux carrier portions 208 of the rotor 306 in both radial sides of the airgap 324 (e.g., the opposite sides of the airgap 324 that are along a direction that radially extends away from the rotation axis 116). Removal or the absence of the posts 114, 214 can significantly reduce the leakage of magnetic flux from the flux carrier portions 208 of the rotor 306, and therefore can significantly increase the torque or torque density generated by the assembly 100 (and/or reduce the amount of current needed to produce the same torque as an assembly that includes the posts 114, 214).

But, removing the posts 114, 214 can pose mechanical problems for operation of the assembly 100. The posts 114, 214 provide structural support for the flux carrier portions 208. Removing the posts 114, 214 to leave an empty airgap 324 can, in some embodiments, result in structural damage or failure to the rotor 306 due to the high speeds at which the rotor 306 rotates. In another embodiment, the airgap 324 is filled or replaced with a non-magnetic post that both reduces leakage of magnetic flux from the flux carrier portions 208 (as the airgap 324 does) and provides structural support to the flux carrier portions 208 to prevent mechanical failure of the portions 208 (which the airgap 324 may not do).

Figure 5:
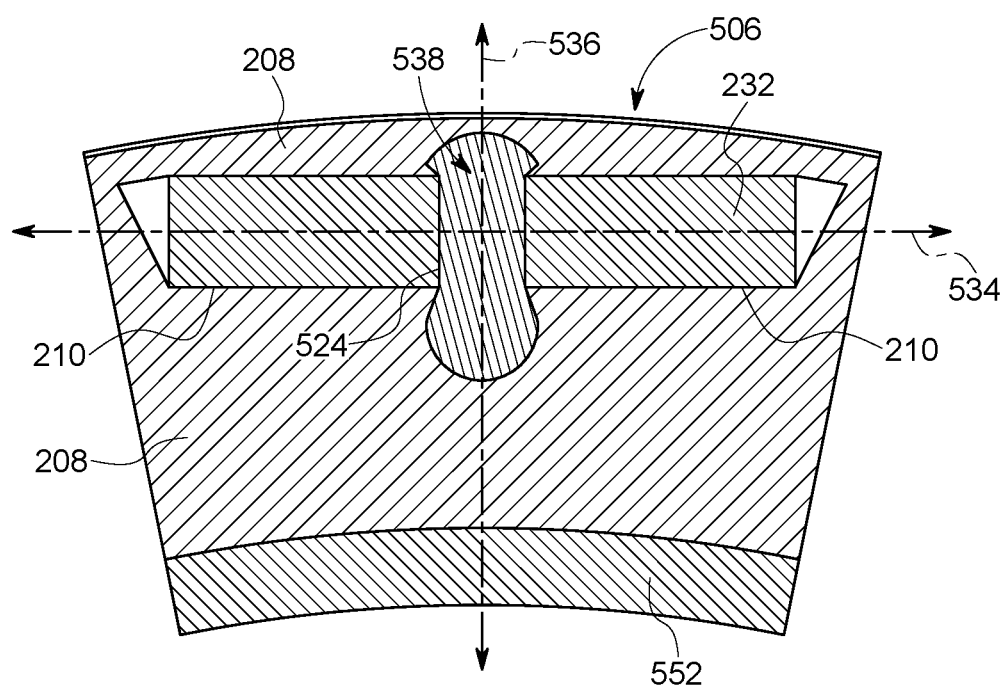
FIG. 5 illustrates a front view of a rotor of the electric machine assembly shown in FIG. 1 according to another embodiment.
Figure 6:
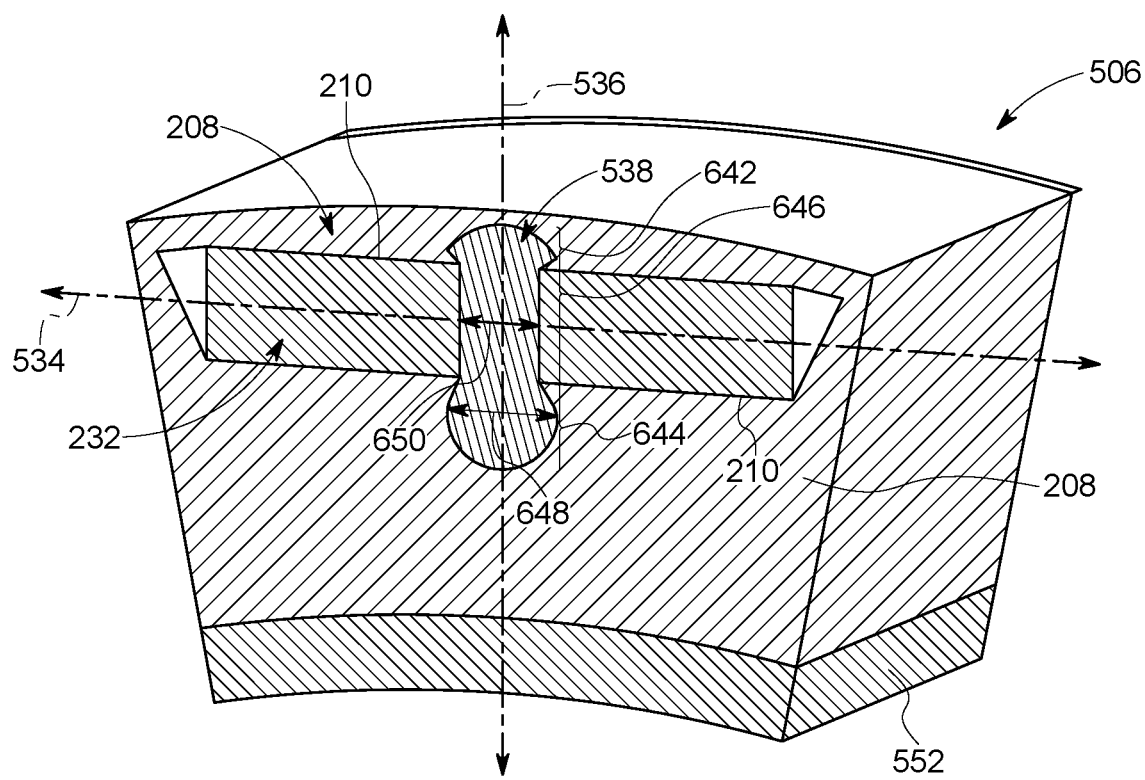
FIG. 6 illustrates a perspective cut-away view of the segment of the rotor shown in FIG. 5 according to one embodiment.
Figure 7:
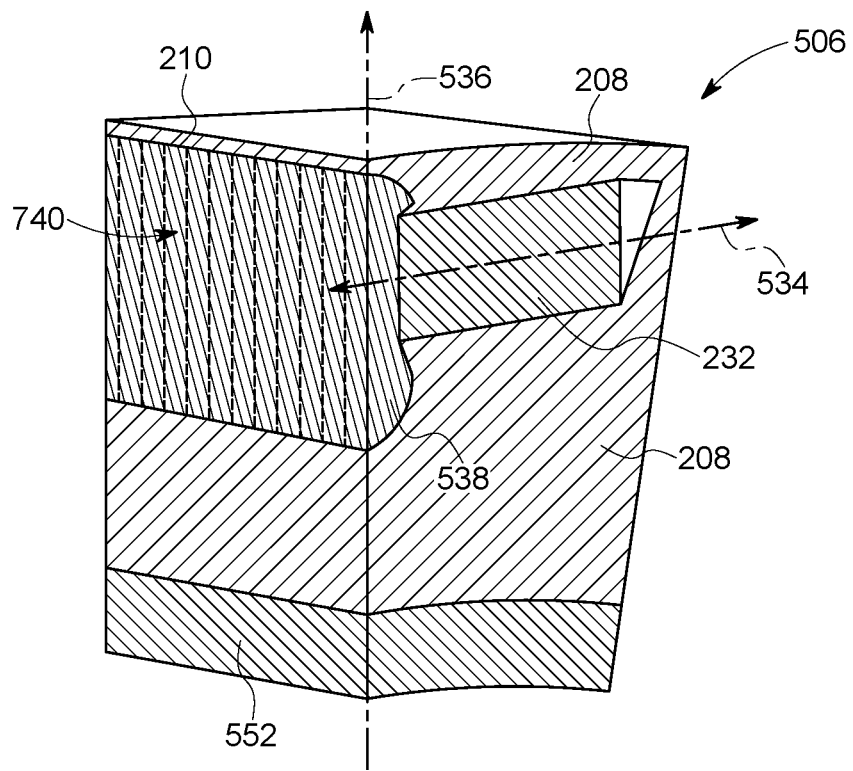
FIG. 7 illustrates a cross-sectional cut-away view of the segment of the rotor shown in FIGS. 5 and 6.

FIG. 5 illustrates a front view of a rotor 506 of the electric machine assembly 100 shown in FIG. 1 according to another embodiment. FIG. 6 illustrates a perspective cut-away view of the segment of the rotor 506 shown in FIG. 5 according to one embodiment. FIG. 7 illustrates a cross-sectional cut-away view of the segment of the rotor 506. The rotor 506 includes the flux carrier portions 208 and flux barrier portions 210 described above. The magnets 232 can be inserted in the barrier portions 210. The rotor 506 is coupled with a shaft 552 that is rotated by the rotor 506 during operation of the assembly 100.

The rotor 506 optionally can include airgaps (not shown) between the magnets 232 along circumferential directions 534 and located between neighboring flux carrier portions 208 along a radial direction 536. The circumferential directions 534 encircle the rotation axis 116 (shown in FIG. 1) of the rotor 506. The radial direction 536 radially extends away from the rotation axis 116. These airgaps can be at least partially filled by a non-magnetic post 538.

The post 538 provides structural support to the flux carrier portions 208 while reducing (or not increasing) the leakage of flux from the flux carrier portions 208. The post 538 is a non-magnetic or non-ferromagnetic body formed from one or more materials that are not ferromagnetic materials in one embodiment. For example, the post 538 can be formed from one or more of aluminum, non-ferromagnetic stainless steel, titanium, copper beryllium, or any other non-magnetic metal, ceramic, composite material (e.g., such as carbon fiber or alloys), etc. Optionally, the non-magnetic post 538 can be made of an insulating, non-metallic material or a high strength alloy that is electrically non-conductive. The post 538 can be formed from thinner sections or plates 740 (shown in FIG. 7) that are coupled together (e.g., by interlocking, press-fitting, lamination, etc.). These sections or plates 740 can be insulated from each other by including a dielectric layer between neighboring sections or plates 740. Alternatively, the post 538 can be formed as a single and/or homogeneous body that is not formed by coupling multiple parts together.

The posts 538 are elongated in the radial directions 536 from one flux carrier portion 208 to another flux carrier portion 208, with these carrier portions 208 being on opposite sides of the same flux barrier portion 210. The posts 538 also are elongated along the direct axes 120 of the rotors 506. Each of the posts 538 is positioned as a bridge between the carrier portions 208 that are on opposite sides of the same barrier portion 210, even though the posts 538 do not carry magnetic flux. For example, the magnetic flux flowing in the carrier portions 208 does not flow through the posts 538 coupling the carrier portions 208 with each other. Instead, the magnetic flux flows or is carried through the carrier portions 208 and predominantly along the quadrature axes 122 of the assemblies 100 due to the quadrature axes 122 providing lower reluctance paths to the flow of the magnetic flux in the rotors 506 relative to the paths along the direct axes 120 (that extend through the posts 538 along the lengths of the posts 538) of the assemblies 100.

The illustrated posts 538 have opposite ends 642, 644 (labeled in FIG. 6) that are joined by an elongated center body 646 (labeled in FIG. 6). The ends 642, 644 can be wider than the center body 646. For example, an outer width dimension 648 (labeled in FIG. 6) of each of the ends 642, 644 can be larger than an outer width dimension 650 (labeled in FIG. 6) in the middle (along the length) of the center body 646. The width dimensions 648, 650 can be measured in the circumferential directions 534 or directions that are parallel to the circumferential directions 534 (e.g., curved directions that do not intersect the circumferential directions). Alternatively, the width dimensions 648, 650 can be measured in directions that are perpendicular to the radial direction 536 and that are in the plane defined by the rotor 506 shown in FIG. 6.

The post 538 shown in FIGS. 5 through 7 has a dog bone shape, but alternatively can have another shape. For example, the post 538 can have a dumbbell shape with a steeper transition between the center body 646 and the ends 642, 644, the post 538 can have a fluted shape with a more gradual transition between the center body 646 and the ends 642, 644, the post 638 can have triangle-shaped ends 642, 644, the post 638 can have dovetail shapes at the ends 642, 644, or the post 638 can have another shape that is able to interlock carrier portions with each other.

Figure 8:
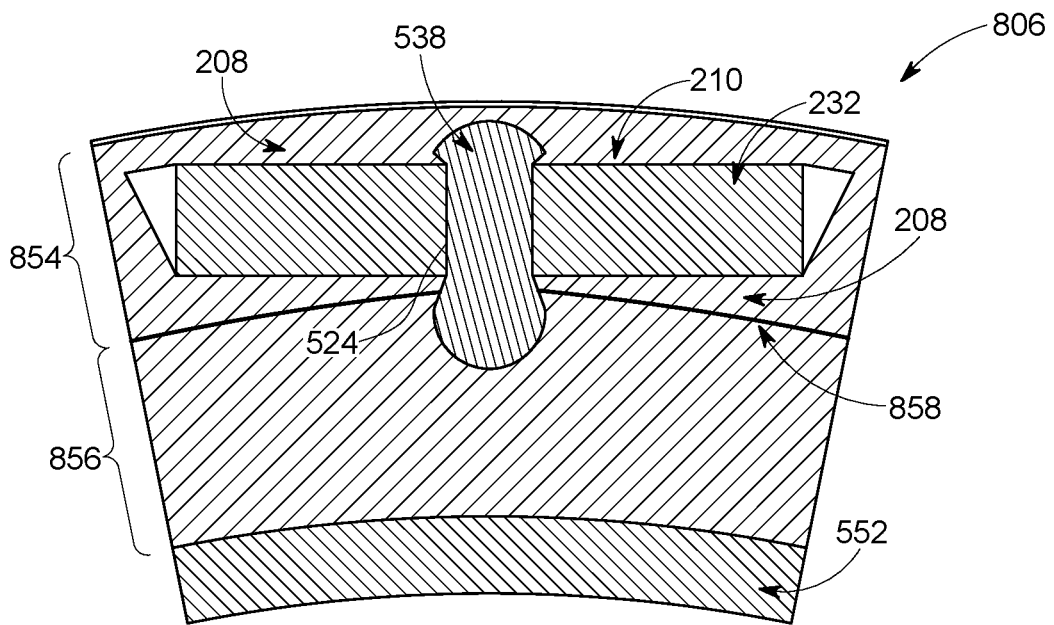
FIG. 8 illustrates a front view of a segment of another embodiment of a rotor of the machine assembly shown in FIG. 1.

FIG. 8 illustrates a front view of a segment of another embodiment of a rotor 806 of the assembly 100. The rotor 806 includes the flux carrier portions 208, flux barrier portions 210, magnets 232, and posts 538 described above. The rotor 806 also is coupled with the shaft 552 described above. The rotor 806 can be a composite rotor that is formed from an assembly 854 of laminated ferromagnetic portions or layers (with the layers being planar and parallel to the plane of FIG. 8) that are shrink-fitted onto a solid ferromagnetic body 856. This shrink fitting can be performed by creating the laminated portion assembly 854 in larger dimensions that shrink during heating or operation of the rotor 806. This shrinking can reduce the dimensions of the assembly 854 to dimensions that couple and secure the assembly 854 to the body 856. Alternatively, a dove tail or other interlocking mechanism can be used to couple the laminated assembly 854 with the solid body 856. In one embodiment, the rotor is formed by coupling the laminated layers of the assembly 854 with the solid body 856 using the posts 538. The laminated assembly 854 is coupled with the solid body 856 at an interface 858. The posts 538 can then be axially slid or otherwise inserted into the airgaps 524. This manufacturing technique can enable the separate portions of the laminated assembly 854, which experience greater electromagnetic losses (e.g., flux leakage), to be laminated together, while other portions that do not experience as much electromagnetic losses to be solid bodies (and thereby easier to forge or machine). In another embodiment, the non-magnetic post 538 can be a part/extension of the shaft 552 (made of same material as 538) wherein the non-magnetic assembly can be axially inserted into the preformed cuts on laminated ferromagnetic portion 854 and solid ferromagnetic portion 856. Alternatively, the posts 538 can be additively manufactured. For example, three-dimensional printing can be used to print the posts in the airgaps of the rotor so that the posts are formed within the rotor and are not formed before placing the posts in the airgaps of the rotor.

In one embodiment, the rotor 506, 806 shown in FIGS. 5 through 8 can include one or more stress relief features. These relief features can include small cut outs or extensions of the airgap 524 into which the post 538 is inserted. For example, each stress relief features can be an arch-shaped cutout or removal of the rotor 506, 806 that axially extends through the layers of the rotor 506, 806. The relief features can be located radially inward and outward of the post 538. For example, one relief feature can be located between the rotation axis 116 of the rotor 506, 806 and the post 538 along the radial direction 536, while another relief feature can be located between the post 538 and the stator 102 along the radial direction 536. Adding the relief features to the rotor 506, 806 can significantly reduce the mechanical stress imparted on or experienced by the rotor 506, 806 at interfaces between the rotor 506, 806 and the post 538 on both sides of the radial direction 536. For example, adding the relief features to the rotor 506, 806 can reduce the maximum principal stress exerted on the rotor 506, 806 at interfaces between the rotor 506, 806 and the post 538 on both sides of the radial direction 536 by at least one order of magnitude. In one embodiment, addition of the relief features reduces the maximum principal stress by at least 14%.

Figure 10:
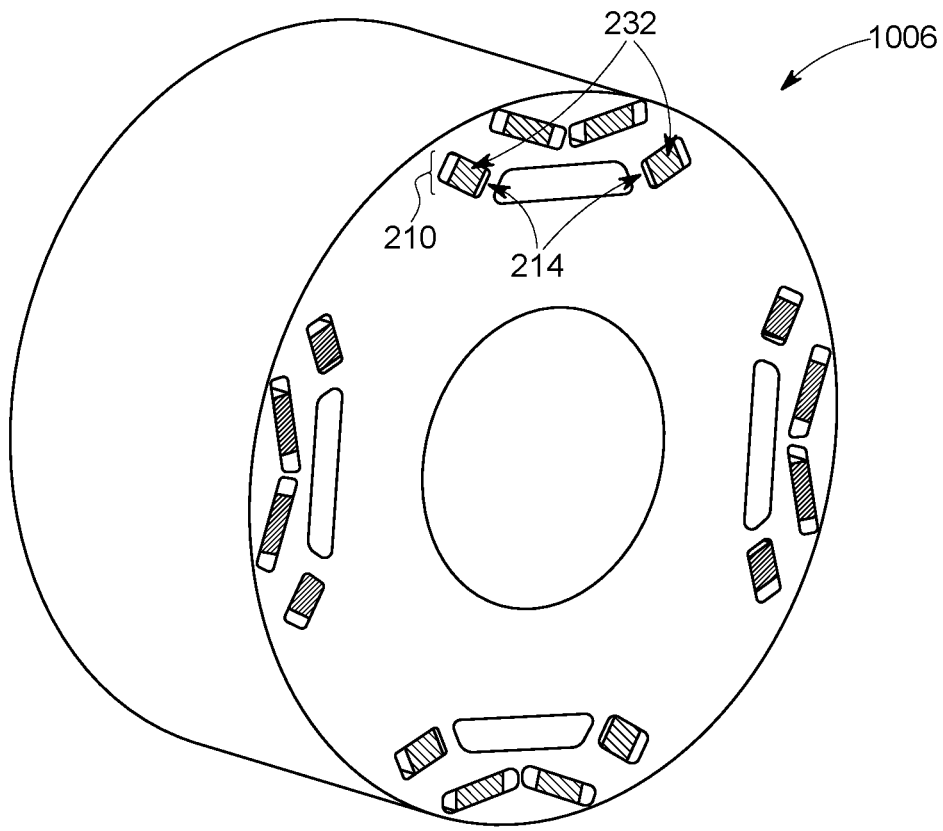
FIG. 10 illustrates another embodiment of a rotor of the electric machine assembly shown in FIG. 1 according to another embodiment.

FIG. 10 illustrates another embodiment of a rotor 1006 of the electric machine assembly 100 shown in FIG. 1 according to another embodiment. The rotor 1006 includes the flux carrier portions 208 and the flux barrier portions 210 described above. One difference between the rotor 1006 and other rotors shown and/or described herein is the presence of one or more posts 214 within the flux barrier portions 210 and multiple, separate magnets 232 in one or more of the flux barrier portions 210. As shown in FIG. 10, posts 214 can radially extend through a flux barrier portion 210 to subdivide the flux barrier portion 210 into multiple, separate chambers. Separate magnets 232 can be inserted into two or more of these chambers defined by the posts 214, also as shown in FIG. 10. Optionally, a flux barrier portion 210 can be divided into a different number of separate chambers by a different number of posts 214 and/or a different number of magnets 232 can be inserted into the same flux barrier portion 210.

Figure 9:
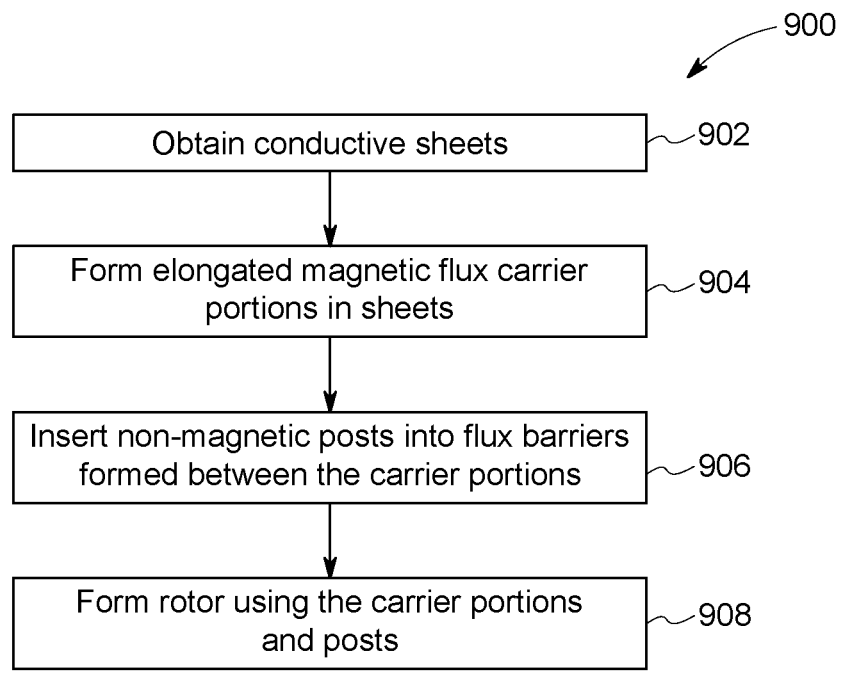
FIG. 9 illustrates a flowchart of one embodiment of a method for manufacturing a rotor of an electric machine assembly.

FIG. 9 illustrates a flowchart of one embodiment of a method 900 for manufacturing a rotor of an electric machine assembly. The method 900 can be used to create one or more of the rotors 506, 806 described herein. At 902, several magnetically conductive sheets are obtained. These sheets can be conductive such that magnetic flux is able to flow through the sheets. The sheets can be cut into the shape of the rotor (e.g., into circles).

At 904, elongated magnetic flux carrier portions are formed into the magnetically conductive sheets. These carrier portions 208 can be formed by cutting elongated magnetic flux barriers 210 into the conductive sheets. The barriers 210 can be cut into the conductive sheets such that the magnetic flux barriers 210 are separated from each other in radial directions 536 of the conductive sheets. The conductive sheets can be laminated together prior to or after forming the carrier portions.

At 906, non-magnetic posts are inserted into the magnetic flux barriers. For example, the posts 538 can be inserted into airgaps 524 formed by the flux barriers 210. The airgaps 524 can be oriented such that each of the non-magnetic posts 538 is elongated in a different radial direction 536 outward from the rotation axis 116 of the rotor 506, 806. The posts 538 are inserted into the airgaps 524 such that the posts 538 extend from one magnetic flux carrier portion 208 to another magnetic flux carrier portion 208 on opposite sides the magnetic flux barrier 210.

At 908, the rotor is formed using the conductive sheets having the magnetic flux carrier portions, the non-magnetic posts, and the magnetic flux barriers. For example, the rotor 506, 806 can be inserted into the stator 102. Optionally, the rotor 506, 806 can be formed by combining a laminate assembly 854 of the conductive sheets with a solid body 856 of ferromagnetic material at an interface 858 that extends through the airgaps 524 and the posts 538.

In one embodiment, an electric machine assembly includes a rotor formed from one or more conductive sheets having elongated magnetic flux barriers separated from each other in radial directions that radially extend away from an axis of rotation of the rotor. The magnetic flux barriers are separated from each other by magnetic flux carrier portions of the one or more conductive sheets. The assembly also includes a non-magnetic post coupled with the magnetic flux carrier portions of the one or more conductive sheets on opposite sides of at least one of the magnetic flux barriers. The non-magnetic post is elongated in the radial directions from a first magnetic flux carrier portion to a second magnetic flux carrier portion of the magnetic flux carrier portions on the opposite sides of the at least one magnetic flux barrier.

Optionally, the non-magnetic post reduces magnetic flux leakage from the one or more conductive sheets such that a torque generated by operation of the rotor is increased relative to another rotor that does not include the non-magnetic post at the same rotor speed and stator excitation.

Optionally, the non-magnetic post is elongated along a direct axis of the rotor having a greater reluctance than a quadrature axis of the rotor.

Optionally, the non-magnetic post is formed from one or more of aluminum, non-ferromagnetic steel, titanium, copper beryllium, another non-ferromagnetic metal material, a ceramic material, a composite material (such as but not limited to carbon fiber), an alloy, or any other non-magnetic material.

Optionally, the non-magnetic post is formed from an electrically insulating material.

Optionally, the non-magnetic post includes opposite ends joined by an elongated center body. The opposite ends can have larger width dimensions in directions that are transverse to the radial directions than a width dimension of the center body in the directions that are transverse to the radial direction.

Optionally, the non-magnetic post has a dog bone shape, a dumbbell shape, an hourglass shape, a dovetail shape, or any other shape capable of having interlocking mechanisms between parts of the rotor.

Optionally, the assembly also includes one or more magnets disposed in the magnetic flux barriers.

In one embodiment, a rotor of an electric machine assembly includes plural magnetically conductive sheets laminated with each other. The conductive sheets have elongated magnetic flux barriers separated from each other in radial directions that radially extend away from an axis of rotation of the rotor. The magnetic flux barriers are separated from each other by magnetic flux carrier portions of the one or more conductive sheets. The rotor also includes multiple non-magnetic posts which are laminated, insulated and coupled with the magnetic flux carrier portions of the one or more conductive sheets on opposite sides of at least one of the magnetic flux barriers. The non-magnetic posts are elongated in the radial directions from a first magnetic flux carrier portion to a second magnetic flux carrier portion of the magnetic flux carrier portions on the opposite sides of each of the magnetic flux barriers.

Optionally, the non-magnetic posts reduce magnetic flux leakage from the one or more conductive sheets such that a torque generated by operation of the electric motor assembly is increased relative to another electric motor assembly that does not include the non-magnetic posts at the same rotor speed and stator excitation.

Optionally, at least one of the non-magnetic posts is elongated along a direct axis of the conductive sheets having a greater reluctance than a quadrature axis of the conductive sheets.

Optionally, the non-magnetic posts are formed from one or more of aluminum, non-ferromagnetic steel, titanium, copper-beryllium, another non-ferromagnetic metal, a ceramic, a composite material (such as but not limited to carbon fiber).

Optionally, the non-magnetic posts are formed from an electrically insulative material.

Optionally, each of the non-magnetic posts includes opposite ends joined by an elongated center body. The opposite ends can have larger width dimensions in directions that are transverse to the radial directions than a width dimension of the center body in the directions that are transverse to the radial direction.

Optionally, each of the non-magnetic posts has a dog bone shape, dumbbell shape, hour-glass shape, dovetail shape, or another suitable shape capable of having interlocking mechanisms between the parts of the rotor.

Optionally, the rotor also includes one or more magnets disposed in the magnetic flux barriers.

In one embodiment, a method includes obtaining magnetically conductive sheets and forming elongated magnetic flux carrier portions of the conductive sheets by cutting elongated magnetic flux barriers into the conductive sheets. The magnetic flux barriers are cut into the conductive sheets such that the magnetic flux barriers are separated from each other in radial directions of the conductive sheets. The method also includes inserting or forming non-magnetic posts into the magnetic flux barriers such that each of the non-magnetic post is elongated in a different radial direction of the radial directions from a first magnetic flux carrier portion to a second magnetic flux carrier portion of the magnetic flux carrier portions on opposite sides of at least one magnetic flux barrier, and forming at least part of a rotor for an electric machine assembly using the conductive sheets having the magnetic flux carrier portions, the non-magnetic posts, and the magnetic flux barriers.

Optionally, inserting the non-magnetic posts reduces magnetic flux leakage from the rotor such that a torque generated by operation of the rotor is increased relative to another rotor that does not include the non-magnetic post at the same rotor speed and stator excitation.

Optionally, the non-magnetic posts are inserted into the magnetic flux barriers such that at least one of the non-magnetic posts is elongated along a direct axis of the rotor having a greater reluctance than a quadrature axis of the rotor.

Optionally, forming the magnetic flux carrier portions includes cutting elongated openings that are oriented along the radial directions of the conductive sheets, the elongated openings having wider opposite end holes joined by a thinner elongated slot.

Optionally, inserting the non-magnetic posts into the magnetic flux barriers includes inserting wider opposite ends of the non-magnetic posts into the wider opposite end holes of the elongated openings and elongated center bodies of the non-magnetic posts into the elongated slot.

Optionally, the method also includes inserting magnets into the magnetic flux barriers.

Optionally, forming at least part of the rotor includes fixing a preformed laminated section of the rotor to a solid body of the rotor using one or more of shrink-fitting or the posts.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. An electric machine assembly comprising:
a rotor formed from one or more magnetically conductive sheets having elongated magnetic flux barriers separated from each other in radial directions, the magnetic flux barriers separated from each other by magnetic flux carrier portions of the one or more conductive sheets; and
a non-magnetic post coupled with the magnetic flux carrier portions of the one or more magnetically conductive sheets on opposite sides of at least one of the magnetic flux barriers, the non-magnetic post elongated in the radial directions from a first magnetic flux carrier portion to a second magnetic flux carrier portion on the opposite sides of the at least one magnetic flux barrier; wherein
the rotor includes one or more stress relief features, each stress relief feature being an arch-shaped cutout or removal of the rotor that axially extends through the rotor, the one or more stress relief features being located radially inward and outward of the non-magnetic post.

2. The electric machine assembly of claim 1, wherein the non-magnetic post reduces magnetic flux leakage from the one or more magnetically conductive sheets such that a torque generated by operation of the rotor is increased relative to another rotor that does not include the non-magnetic post at the same rotor speed and stator excitation.

3. The electric machine assembly of claim 1, wherein the non-magnetic post is elongated along a direct axis of the rotor.

4. The electric machine assembly of claim 1, wherein the non-magnetic post is formed from one or more of aluminum, non-ferromagnetic steel, titanium, copper beryllium, another non-ferromagnetic metal material, a ceramic material, a composite material, or an alloy.

5. The electric machine assembly of claim 1, wherein the non-magnetic post is formed from an electrically insulating material.

6. The electric machine assembly of claim 1, wherein the non-magnetic post includes opposite ends joined by an elongated center body, the opposite ends having larger width dimensions in directions that are transverse to the radial directions than a width dimension of the center body in the directions that are transverse to the radial direction.

7. The electric machine assembly of claim 6, wherein the non-magnetic post has a dog bone, dumbbell, hourglass, or dovetail shape.

8. The electric machine assembly of claim 1, further comprising one or more magnets disposed in the magnetic flux barriers.

9. A rotor of an electric machine assembly, the rotor comprising:
plural magnetically conductive sheets laminated with each other, the magnetically conductive sheets having elongated magnetic flux barriers separated from each other in radial directions, the magnetic flux barriers separated from each other by magnetic flux carrier portions of the magnetically conductive sheets; and
multiple non-magnetic posts which are laminated, insulated and coupled with the magnetic flux carrier portions of the magnetically conductive sheets on opposite sides of at least one of the magnetic flux barriers, the non-magnetic posts elongated in the radial directions from a first magnetic flux carrier portion to a second magnetic flux carrier portion on the opposite sides of each of the magnetic flux barriers; wherein
the rotor includes one or more stress relief features, each stress relief feature being an arch-shaped cutout or removal of the rotor that axially extends through the rotor, the one or more stress relief features being located radially inward and outward of the non-magnetic post.

10. The rotor of claim 9, wherein the non-magnetic posts reduce magnetic flux leakage from the one or more magnetically conductive sheets such that a torque generated by operation of the electric machine assembly is increased relative to another electric machine assembly that does not include the non-magnetic posts at the same rotor speed and stator excitation.

11. The rotor of claim 9, wherein at least one of the non-magnetic posts is elongated along a direct axis of the magnetically conductive sheets.

12. The rotor of claim 9, wherein the non-magnetic post is formed from one or more of aluminum, non-ferromagnetic steel, titanium, copper-beryllium, another non-ferromagnetic metal, a ceramic, or a composite material.

13. The rotor of claim 9, wherein the non-magnetic posts are formed from an electrically insulating material.

14. The rotor of claim 9, wherein each of the non-magnetic posts includes opposite ends joined by an elongated center body, the opposite ends having larger width dimensions in directions that are transverse to the radial directions than a width dimension of the center body in the directions that are transverse to the radial direction.

15. The rotor of claim 14, wherein each of the non-magnetic posts has a dog bone, dumbbell, hour-glass, or dovetail shape.

16. The rotor of claim 9, further comprising one or more magnets disposed in the magnetic flux barriers.

\* \* \* \* \*